United States Patent
Xu et al.

(10) Patent No.: US 12,272,137 B2
(45) Date of Patent: Apr. 8, 2025

(54) VIDEO OBJECT DETECTION AND TRACKING METHOD AND APPARATUS

(71) Applicant: Samsung Electronics Co., Ltd., Suwon-si (KR)

(72) Inventors: Jingtao Xu, Beijing (CN); Yiwei Chen, Beijing (CN); Changbeom Park, Seoul (KR); Hyunjeong Lee, Seoul (KR); Byung In Yoo, Seoul (KR); Jaejoon Han, Seoul (KR); Qiang Wang, Beijing (CN); Jiaqian Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 17/537,762

(22) Filed: Nov. 30, 2021

(65) Prior Publication Data
US 2022/0180633 A1   Jun. 9, 2022

(30) Foreign Application Priority Data

Dec. 4, 2020   (CN) .......................... 202011411959.6
Oct. 20, 2021  (KR) ......................... 10-2021-0140401

(51) Int. Cl.
*G06V 20/40* (2022.01)
*G06F 18/22* (2023.01)
(Continued)

(52) U.S. Cl.
CPC .............. *G06V 20/41* (2022.01); *G06F 18/22* (2023.01); *G06V 10/225* (2022.01); *G06V 10/235* (2022.01); *G06V 10/443* (2022.01); *G06V 10/75* (2022.01); *G06V 10/761* (2022.01); *G06V 20/46* (2022.01); *G06V 2201/07* (2022.01)

(58) Field of Classification Search
CPC .... G06V 20/41; G06V 10/225; G06V 10/235; G06V 10/443; G06V 10/75; G06V 10/761; G06V 20/46; G06V 2201/07; G06V 10/454; G06V 10/806; G06V 10/82; G06V 20/52; G06V 10/751; G06V 10/25; G06V 10/771; G06V 20/40; G06F 18/22; G06T 7/248
See application file for complete search history.

(56) References Cited

U.S. PATENT DOCUMENTS 9,092,700 B2   7/2015 Wang et al.
11,328,513 B1 *  5/2022 Osherovich .......... G06V 40/168
(Continued)

OTHER PUBLICATIONS

S. Ray, Kumar, et al. "Object Detection by Spatio-Temporal Analysis and Tracking of the Detected Objects in a Video with Variable Background" arXiv:1705.02949v1 Apr. 28, 2017 (13 pages in English).

(Continued)

*Primary Examiner* — Andrew M Moyer
*Assistant Examiner* — Ahmed A Nasher
(74) *Attorney, Agent, or Firm* — NSIP Law

(57) ABSTRACT

A target object detection method and apparatus are provided. The target object detection method and apparatus are applicable to fields such as artificial intelligence, object tracking, object detection, and image processing. An object is detected from a frame image of a video including a plurality of frame images based on a target template set including one or more target templates.

17 Claims, 8 Drawing Sheets

(51) Int. Cl.
    *G06V 10/22*     (2022.01)
    *G06V 10/44*     (2022.01)
    *G06V 10/74*     (2022.01)
    *G06V 10/75*     (2022.01)

(56) References Cited

U.S. PATENT DOCUMENTS

| | | | | |
|---|---|---|---|---|
| 11,429,658 | B1* | 8/2022 | Richter | G06F 16/483 |
| 2020/0126241 | A1 | 4/2020 | Wang et al. | |
| 2021/0406553 | A1* | 12/2021 | Wu | G06V 10/75 |
| 2022/0215650 | A1* | 7/2022 | Oami | G06V 10/44 |
| 2023/0120093 | A1* | 4/2023 | Ogawa | G06T 7/246 |
| | | | | 382/103 |
| 2023/0154016 | A1* | 5/2023 | Ogawa | G06V 10/82 |
| | | | | 382/103 |

OTHER PUBLICATIONS

J. Geng, Joy, et al. "Template-to-distractor distinctiveness regulates visual search efficiency" *CurrOpinPsychol Center for Mind and Brain, University of California Davis,* Oct. 2019 (12 pages in English).

Yang, Tianyu, et al. "Visual Tracking via Dynamic Memory Networks" *Journal of Latex Class Files* vol. 14 No. 8 arXiv:1907.07613v3. Nov. 29, 2019 (14 pages in English).

Li, Guiji, et al. "Reliable correlation tracking via dual-memory selection model" *Information Sciences* vol. 518 Jan. 11, 2020 (18 pages in English).

Nam, Gunhee, et al. "DMV: Visual Object Tracking via Part-level Dense Memory and Voting-based Retrieval" arXiv:2003.09171v1 Mar. 20, 2020 (22 pages in English).

M. Raham, Maklachur, et al. "Efficient Visual Tracking with Stacked Channel-Spatial Attention Learning" *IEEE Access* May 27, 2020 (13 pages in English).

Kong, Garry, et al. "Working memory is corrupted by strategic changes in search templates" *Journal of Vision* Aug. 3, 2020 (10 pages in English).

Yang, Tianyu, et al."ROAM: Recurrently Optimizing Tracking Model" *CVPR IEEEE Xplore* 2020 (10 pages in English),

* cited by examiner

VIDEO OBJECT DETECTION AND TRACKING METHOD AND APPARATUS

CROSS-REFERENCE TO RELATED APPLICATION

This application claims the benefit under 35 USC § 119(a) of Chinese Patent Application No. 202011411959.6 filed on Dec. 4, 2020, in the China National Intellectual Property Administration, and Korean Patent Application No. 10-2021-0140401 filed on Oct. 20, 2021, in the Korean Intellectual Property Office, the entire disclosures of which are incorporated herein by reference for all purposes.

BACKGROUND

1. Field

The following description relates to a video object detection and tracking method and apparatus.

2. Description of Related Art

Visual object tracking is one of the important aspects in computer vision technology. Object tracking is typically used to track moving objects, such as, but not limited to, people, animals, aircraft, cars, and the like.

In the process of tracking a moving object, a target object to be tracked may be indicated in a first frame (also referred to as an initial frame) of a video. An object tracking algorithm may continuously track the target object in subsequent frames of the video, and provide position information of the target object within the frames.

For object tracking, template information associated with the target object may be extracted based on the target object indicated in the first frame. Within search areas of the subsequent video frames, matching degrees between the template information and a plurality of other candidate areas are calculated, and a best matching candidate area is determined to be the position of the target object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an object detecting method includes detecting an object from a frame image of a video comprising a plurality of frame images based on a target template set; and; and outputting information regarding the detected object, wherein the target template set comprises one or more target templates, and wherein each of the one or more target templates comprises information of the object in respective frame images determined to be frame images including the object among previous frame images of the frame image of the video.

The target template set may further include an initial target template, and the initial target template comprises information of the object in a frame image determined by a user to be a frame image that includes the object among the frame images of the video, or a separate image that is independent of the video and includes the object.

The detecting of the object from the frame image may include determining an integrated target feature by integrating image features of image areas respectively corresponding to target templates included in the target template set; obtaining one or more target candidate areas determined to be target candidate areas including the object in the frame image, based on the integrated target feature; and determining one target area from among the one or more target candidate areas.

The obtaining of the one or more target candidate areas may include determining a plurality of search areas within the frame image; obtaining search area features by extracting respective image features of the plurality of search areas; calculating correlations between the search area features of the plurality of search areas and the integrated target feature; and determining the one or more target candidate areas from among the plurality of search areas based on the correlations.

The method may include updating the target template set, wherein the updating of the target template set may include calculating a similarity of the target area to the integrated target feature of the target template set; and adding the target area as a target template to the target template set in response to the similarity being less than a threshold.

The detecting of the object from the frame image may include obtaining one or more target candidate areas determined to be target candidate areas including the object in the frame image; and determining one target area from among the one or more target candidate areas, wherein the method may further include updating the target template set in response to the target area satisfying a predetermined condition.

The updating of the target template set may include calculating similarities of the target area to all target templates of the target template set; and adding the target area as a target template to the target template set in response to all the similarities of the target area being less than a threshold.

The detecting of the object from the frame image may include detecting the object from the frame image based on the target template set and an interference template set, wherein the interference template set may include one or more interference templates, and wherein each of the one or more interference templates comprises information regarding an interference object that interferes with the detection of the object among the previous frame images of the frame image of the video.

The detecting of the object from the frame image may include obtaining one or more target candidate areas determined to be target candidate areas including the object in the frame image, based on the target template set and the interference template set; and determining one target area from among the one or more target candidate areas.

The determining of the one target area from among the one or more target candidate areas may include calculating matching degrees of the one or more target candidate areas to each target template of the target template set; calculating matching degrees of the one or more target candidate areas to each interference template of the interference template set; calculating target matching degrees of the target candidate areas based on the matching degrees of the target candidate areas to each target template of the target template set and the matching degrees of the target candidate areas to each interference template of the interference template set; and determining one target area from among the one or more target candidate areas based on the target matching degrees of the target candidate areas.

The calculating of the target matching degrees of the target candidate areas may include calculating the target matching degrees of the target candidate areas based on one of a mean value and a median value of the matching degrees of the target candidate areas to each target template of the target template set and/or one of a mean value and a median value of the matching degrees of the target candidate areas to each interference template of the interference template set.

The obtaining of the one or more target candidate areas may include determining an integrated target feature based on the target template set; determining an integrated interference feature based on the interference template set; and obtaining the one or more target candidate areas from the frame image based on the integrated target feature and the integrated interference feature.

The determining of the integrated target feature based on the target template set may include determining the integrated target feature by integrating image features of image areas respectively corresponding to target templates included in the target template set, and wherein the determining of the integrated interference feature based on the interference template set may include determining the integrated interference feature by integrating image features of image areas respectively corresponding to interference templates included in the interference template set.

The determining of the integrated target feature based on the target template set may include determining the integrated target feature based on all target templates included in the target template set, and wherein the determining of the integrated interference feature based on the interference template set comprises determining the integrated interference feature based on all interference templates included in the interference template set.

The method may include updating the interference template set, wherein the updating of the interference template set comprises adding one of a portion or all of the other target candidate areas except for the one target area among the one or more target candidate areas as interference templates to the interference template set.

The method may further include updating the interference template set, wherein the updating of the interference template set may include calculating similarities of one of a portion or all of the other target candidate areas to the integrated interference feature of the interference template set; and adding a target candidate area having a similarity less than a threshold value among the portion or all of the other target candidate areas as an interference template to the interference template set.

In a general aspect, an electronic device includes a memory and one or more processors, wherein the memory is communicatively coupled to the processor, and stores processor instructions, which, on execution, causes the processor to: detect an object from a frame image of a video based on a target template set; and output information regarding the detected object, wherein the video comprises a plurality of frame images, wherein the target template set comprises one or more target templates, and wherein each of the one or more target templates comprises information of the object in respective frame images determined to be frame images including the object among previous frame images of the frame image of the video.

Other features and aspects will be apparent from the following detailed description, the drawings, and the claims.

Figure 1:
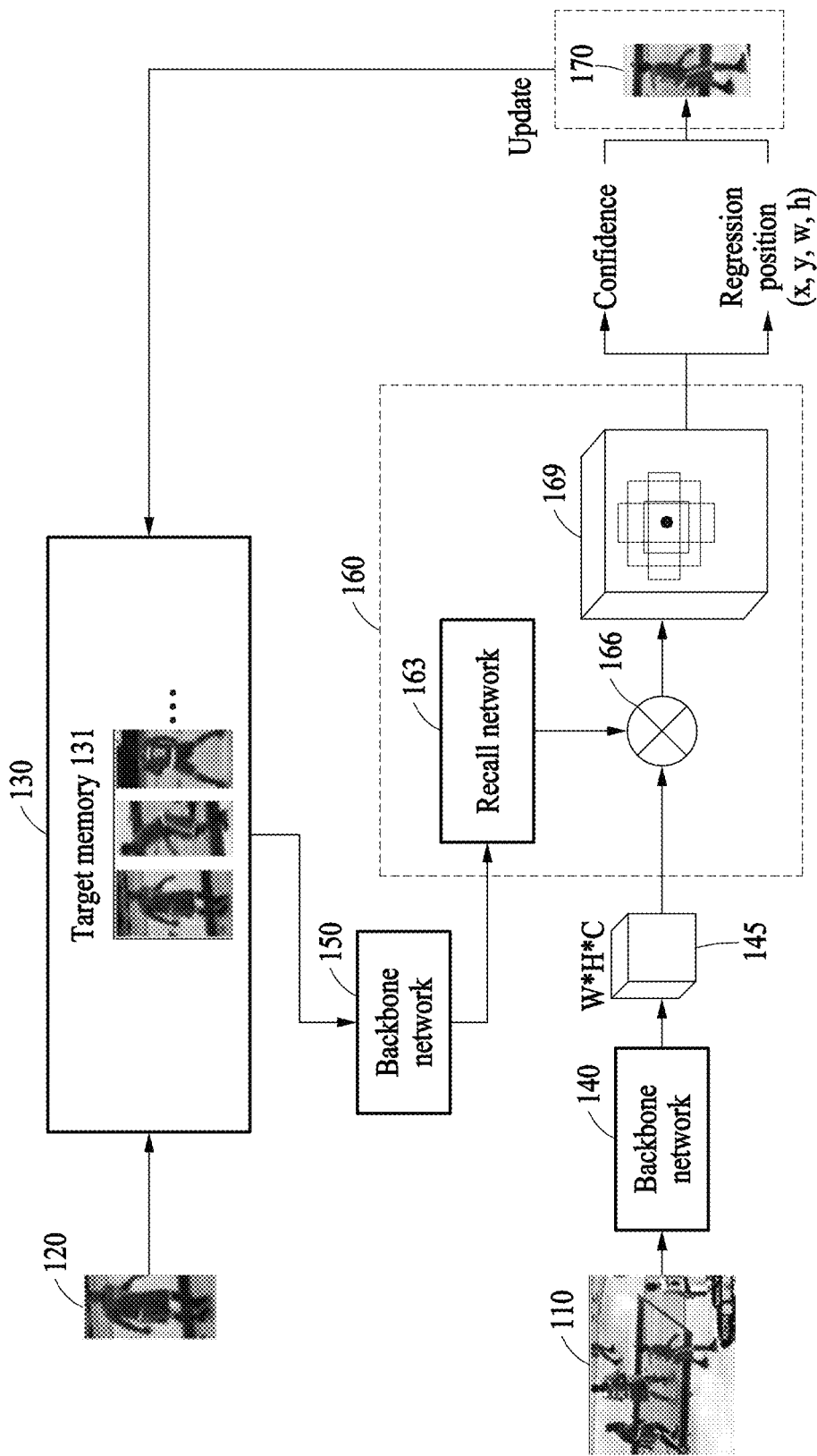
FIG. 1 illustrates an example of an object tracking method, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on,"

"connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted.

In tracking a target object in a video image, feature information of the target object to be tracked may be changed due to factors such as, but not limited to, a change in lighting, a change in scale, a background interference, a deviation from a field of view, an in-plane rotation, a low resolution, a fast motion, a motion blur, and an occlusion. This may reduce the accuracy of object identification and/or object tracking. Examples set forth herein provide object detection methods that may solve at least one of the above issues. These methods may be executed by various electronic devices such as, but not limited to, terminal devices, servers, and the like.

An example provides a method of detecting and/or tracking an object from a frame image of a video including a plurality of frame images.

The method may detect and/or track the object from the frame image based on a target template set, and output information regarding the detected object.

The method may be used to track and detect a target object in a video or to detect a target object from a predetermined frame image, but is not limited thereto.

A source of the video to which examples are applicable is not limited. In an example, the video source may be a movie, or may be a video captured through a visible light camera, such as a CCTV image, a surveillance image, or a live video of a sports event, but is not limited thereto.

An object detection method according to an example may be applied to visual object tracking. Visual object tracking is an aspect in computer vision, and has various practical applications in daily life. In an example, object tracking/detection according to an example may be used to find a target object (e.g., a suspect, a missing child, a missing elderly person, a missing animal, etc.) from a surveillance image, or may locate a target player from a live video of a sports event. Additionally, the object tracking/detection according to an example may also be used to determine a path traveled by a vehicle in a surveillance image, or to track a small aircraft in flight. As another example, the object tracking/detection according to an example may be used in a smart phone to help with camera focusing, video effect generation, moving object analysis, and the like. Scenarios to which the object tracking/detection according to examples is applied may be determined according to actual needs, and are not limited thereto.

When applied to video tracking and/or detection, a target template set may include one or more target templates. Each of the one or more target templates corresponds to one of previous frame images of a subject frame image of a video. Each of the one or more target templates may include information of a target object in respective frame images determined to be those including the object among the previous frame images of the subject frame image of the video. The information of the target object may be an image area in which the target object is positioned.

The target object may be understood to be an object to be tracked and/or detected, such as a moving person, animal, or a transportation vehicle (for example, a car, an aircraft, etc.). The target object to be tracked and/or detected may be selected according to actual needs, and is not limited herein. Optionally, an object to be tracked in the video (i.e., the target object) may be determined based on an indication or an operation of a user, or may be determined based on an image of a known object. In an example, the user may determine the target object by indicating an object in a video frame where the target object first appears in the video, and an image area selected by the user in this manner may be used as an initial target template of the target object. Alternatively, the initial target template may be an image of a known object. In an example, to search for a predetermined person, a photo of the person may be used as an initial target template.

The target template set may be stored in a storage such as a memory or a hard disk. Herein, a storage for storing a target template set is referred to as a "target memory". Target templates included in the target template set may include image areas corresponding to results of detecting the target object in detected frame images of the video (that is, areas in which the target object is positioned in the respective frame images). In an example, the target templates may be image areas in which the target object is positioned in the frame images. That is, the image areas including the target object in the frame images may be used as the target templates. In an example, the target templates stored in the target template set may be feature information of subject image areas. In an example, the target templates may be image feature information representing image areas, extracted from the images. That is, the feature information extracted from the image areas including the target object in the frame images may be used as the target templates. Additionally, the target templates included in the target template set may be position information of the target object detected in the respective frame images.

Additionally, the target template set may include the initial target template. The initial target template may be information of the target object in the frame images determined by the user to be frame images including the target object among the frame images of the video. For example, the user may determine the initial target template in the frame image where the target object first appears in the video. The user may indicate the target object to be tracked or designate an image area including the target object, in the frame image where the target object first appears. The image area designated in this manner may be implemented as an initial target template, and feature information of the image area may be used as an initial target template.

In an example, the initial target template may be obtained from a separate image that is independent of the video in which the target object is to be tracked, and may include the target object. In an example, to track and/or identify a predetermined person, a photograph or likeness of the person or image feature information of the photograph or likeness of the person may be used as the initial target template.

The target template set may further include, in addition to the initial target template, target templates corresponding to other frame images in which the target object is already detected. In an example, the target template set may further include at least one target template corresponding to at least one of the previous frame images of the frame image in which the target object is to be detected/tracked in the video.

In an example, when a subject frame image is a second frame image, a previous frame image is a first frame image. When it is determined that the target object is included in the first frame image, the target template set may include information (a first target template) regarding an image area including the target object in the first frame image.

When the subject frame image is a third frame image, previous frame images may include the first frame image and the second frame image. When it is determined that the target object is included in the first frame image and the second frame image, the target template set may include information (the first target template) regarding the image area (target area) including the target object in the first frame image and information (a second target template) regarding an image area including the target object in the second frame image.

In an example, for the subject frame image, all target templates corresponding to all previous frame images of the subject frame image may be included in the target template set.

According to an example, the target template set may not include the target templates corresponding to all frame images determined to be frame images including the target object among the previous frame images, but only a portion of the target templates. For example, for the subject frame image, only a target template satisfying a predetermined condition among all the previous frame images of the subject frame image may be included in the target template set. The predetermined condition may be configured according to an example.

In an example, whether to add a new target template to the target template set may be determined according to similarities or matching degrees of the new target template to target templates already stored in the target template set. In an example, if the similarities or the matching degrees are lower than a threshold, the new target template may be included in the target template set. Accordingly, a target template similar to the target templates already included in the target template set (a target template having similarities higher than the threshold) may not be added to the target template set. By not adding a target template similar to the existing target templates, an amount of subsequent data computation may be effectively reduced.

Depending on a subject frame image, a different target template set may be used when detecting a target object in the subject frame image. In an example, a target template set used when detecting the target object in a 50th frame image may be different from a target template set used when detecting the target object in a 200th frame image. Similarly, each target template set to be used may include a different number of target templates.

When tracking and/or detecting the target object in the video, results of detecting the target object may be obtained by detecting the target object in a subject frame image through the target template set. The detection results may be an image area determined to be an image area including the target object in the subject frame image, image feature information of the image area, or position information of the target object in the subject frame image. Additionally, the detection results may further include a confidence thereof. The confidence may be used to process the detection results and be a value in a range of [0, 1].

In an example, through the target template set, the target object may be detected and/or tracked in a frame image, and results of detecting the target object in the frame image may be obtained. According to this method, since the target template set may include not only the initial target template but also the target templates corresponding to the image areas in which the target object is positioned in the previous frame images, the information included in the target template set is enriched. That is, the diversity of the target templates included in the target template set may further enrich the information to be used to detect the target object and may also improve the accuracy of the detection results.

In an example, detecting the object from the frame image may include detecting the object from the frame image based on the target template set and an interference template set.

The interference template set may include one or more interference templates. Each of the one or more interference templates may include information regarding an interference object that interferes with the detection of the object among the previous frame images of the frame image of the video.

The interference object may also be referred to as an interfering object, that is, an object that interferes with the detection of the target object. The interference object may be an object, texture (non-object) or shape that is (visually) similar to the target object to be tracked in the frame image of the video.

The interference template set is stored in a storage such as a memory or a hard disk. Herein, a storage device that stores an interference template set is referred to as an "interference memory". Interference templates included in the interference template set may include image areas including the interference object that interferes with the detection of the target object in the frame images of the video (i.e., areas in which the interference object is positioned in the frame images). In an example, the interference templates may be image areas in which the interference object corresponding to the target object is positioned in the frame images. That is, the image areas including the interference object in the frame images may be used as the interference templates. Alternatively, the interference templates may include image areas other than the image area (the target area) determined to be an image area including the target object in the frame image. In an example, the interference templates stored in the interference template set may be feature information of image areas including the interference object. In an example, the interference templates may be image feature information representing image areas, extracted from the images. That is, the feature information extracted from the image areas including the interference object in the respective frame images may be used as the interference templates. Additionally, the interference templates included in the interference template set may be position information of the interference object detected in the frame images.

In an example, the interference template set may include interference templates corresponding to the target object. The respective interference templates may be image areas in which the interference object of the target object is positioned in the previous frame images of the subject frame image.

In an example, when the subject frame image is a third frame image, the previous frame images include a first frame image and a second frame image. When the target object is selected by the user in the first frame image, the initial target template is an image area selected by the user in the first frame image. Additionally, the interference object may be selected from the first frame image in response to a selection of the user. In this example, information pertaining to an image area corresponding to the selected interference object may be added to the interference template set. Optionally, the detection of the interference object corresponding to the target object may not be performed with respect to the first frame image. That is, the detection of the interference object from the first frame image may not be performed.

When the target object is detected in the second frame image, a plurality of target candidate areas may be obtained, and a portion or all of target candidate areas (image areas) other than the target area determined to be the image area or target candidate area including the target object among the plurality of target candidate areas, may be determined to be image areas in which the interference object of the target object is positioned. The determined image areas may be added as interference templates to the interference template set.

To detect the target object in the third frame image, target templates (the target template obtained from the first frame image and the target template obtained from the second frame image) included in the target template set and the interference templates (the interference templates obtained from the second frame image) included in the interference template set may be used. Further, when detecting the target object in the third frame image, additional interference templates may be obtained from the third frame image by the same method.

In an example, when detecting the target object from a frame image, both information in the target template set and information in the interference template set may be considered. That is, the target object having a high similarity to the target template set and a low similarity to the interference template set may be detected.

Information pertaining to the interference object may include, for example, an image area determined to contain the interference object in a previous frame image, image feature information of the image area, or position information of the interference object in the previous frame image.

In the video, the target object may have various changes due to a change in lighting, a rotation of the target object, a fast motion, a motion blur, an occlusion, a deformation, and a background interference. According to examples, such changes in the target object may be stored in the target memory (or the target template set), whereby the target object may be identified and tracked more accurately.

Further, according to examples, image features of the interference object that interferes with the detection of the target object may be stored in the interference memory (or the interference template set), whereby the effect of the interference object in the detection of the target object may be eliminated or reduced.

This method of detecting the target object by integrating the target memory (or the target template set) and the interference memory (or the interference template set) may not only comprehensively reflect various features of the target object, but may also eliminate or reduce the negative effect of the interference object, thereby greatly improving the accuracy of identifying and/or tracking the target object.

In an example, the detecting of the object in the frame image may include obtaining one or more target candidate areas determined to be target candidate areas including the object in the frame image, and determining one target area from among the one or more target candidate areas.

The target candidate areas may also be referred to as candidate areas, anchor regions, anchor boxes, or anchors indicating possible positions of the target object in the frame image. The target candidate areas may vary in position and size.

In an example, when detecting the target object in an image frame, the one or more target candidate areas may be obtained from the image frame using the target template set.

In an example, the obtaining of the one or more target candidate areas may include determining a plurality of search areas within the frame image, obtaining search area features by extracting respective image features of the plurality of search areas, calculating correlations between the search area features of the plurality of search areas and the integrated target feature, and determining the one or more target candidate areas from among the plurality of search areas based on the correlations.

In an example, a plurality of search area boxes may be obtained from a subject frame image. In an example, the plurality of search area boxes may be set around an area determined to be an area including the target object in a previous frame. According to an example, all images of the search area boxes may be target candidate areas. According to another example, the images of the respective search area boxes may be matched one by one to the respective target templates in the target template set. Alternatively, the images of the respective search area boxes may be matched to an integration template obtained by integrating all the target templates in the target template set. After the matching, one or more search areas with relatively high matching degrees may be selected as the target candidate areas. Then, a target area is selected from among the target candidate areas, and results of detecting the target object are obtained based on the target area.

It can be understood that examples may be implemented by a neural network model that is trained in advance.

FIG. 1 illustrates an example of a neural network model implementing an object tracking method, in accordance with one or more embodiments.

Referring to FIG. 1, an example of a video including sports scenes of players is provided. A target object to be tracked in the video is a predetermined player (referred to as a "target player"). A current frame image 110 is a frame image in the video in which the target player is to be detected. In the example of FIG. 1, when a user finds a target object (the target player) during the playback of the video, the user may indicate or select the target object in a frame image. Then, information of a portion (the portion including the target object) of the frame image may be used as an initial target template 120.

A memory pool 130 includes a target memory 131. The target memory 131 is a storage space that stores a target template set. The memory pool 130 may be implemented as a memory, a hard disk drive (HDD), a flash memory, or the like, but is not limited thereto. The target template set stores the initial target template 120 and target templates corresponding to frame images previous to the current frame image 110.

In an example, to detect a target object in the current frame image 110, the current frame image 110 is input to a backbone network 140. The backbone network 140 may be a network that extracts features of an image by implementing a neural network, and may include MobileNet, ResNet, Xception Network, and the like, but is not limited thereto. The backbone network 140 receives the current frame image 110, and outputs image features 145 corresponding to the current frame image 110. In an example, the backbone network 140 may output W×H×C as the image features 145 of the current frame image 110. W×H×C is a feature map, where W and H denote the width and height of the feature map, respectively, and C denotes the number of channels (i.e., the number of features) of the feature map.

According to another example, a plurality of search areas may be determined within the current frame image 110. The search areas may be a portion of image areas in the current frame image 110. Each of the plurality of search areas is input to the backbone network 140. The backbone network 140 outputs the search area features 145 respectively for the plurality of search areas.

When the target templates stored in the target template set are images, the target templates of the target template set stored in the target memory 131 are input to a backbone network 150 to obtain one or more target candidate areas. The backbone network 150 is a network that extracts features of an image by implementing a neural network, and may include MobileNet, ResNet, Xception Network, and the like, but is not limited thereto. The neural network may be configured to perform, as non-limiting examples, object classification, object recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. The backbone network 150 may be the same as, or different from, the backbone network 140. The backbone network 150 receives the target templates and outputs image features corresponding to the target templates to a recall network 163. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, the target templates stored in the target template set may be features of corresponding images. In this example, the features of the images corresponding to the respective target templates may not need to be extracted through the backbone network 150, and thus, the target templates may be input directly to the recall network 163.

In an example, a processor 160 may include the recall network 163, a correlation calculator 166, and an anchor processor 169. The recall network 163, the correlation calculator 166, and the anchor processor 169 may be conceptually divided by functions, and may not necessarily be implemented to be physically separate. In an example, the recall network 163, the correlation calculator 166, and the anchor processor 169 may all be different functions processed by the processor 160, and may be divided for ease of description.

The recall network 163 outputs an integrated target feature by integrating image features of image areas respectively corresponding to the target templates included in the target template set. The recall network 163 is a network that integrates input image features by implementing a neural network, and may include a feature fusion convolutional neural network (FFCNN) and the like, but is not limited thereto.

The correlation calculator 166 calculates correlations between the image features 145 of the current frame image 110 and the integrated target feature. Alternatively, the correlation calculator 166 calculates correlations between search area features of the plurality of search areas in the current frame image 110 and the integrated target feature. Based on the calculated correlations, one or more target candidate areas (also referred to as "candidate anchors") may be determined from among the plurality of search areas.

The correlations calculated by the correlation calculator 166 are input to the anchor processor 169. The anchor processor 169 may output confidences and/or regression results respectively for the one or more target candidate areas (candidate anchors). In an example, the regression results may include a regression position (x, y, w, h). In an example, x and y may denote horizontal and vertical coordinates of a particular point in a corresponding target candidate area. In an example, x and y may be horizontal and vertical coordinates of a predetermined vertex in the target candidate area, such as a center point of the target candidate area, a vertex of an upper-left edge, or the like. Additionally, w and h may denote the width and height of the target candidate area.

According to the confidences and/or the regression results of the target candidate areas, one target candidate area (final anchor) 170 is selected from among the plurality of target candidate areas (candidate anchors).

Based on a confidence and/or a regression result of the selected target candidate area (the final anchor) 170, a position of the target object and a corresponding detection confidence may be obtained from the current frame image 110. The information regarding the target object detected in this way is output.

Additionally, the target memory 131 may be updated according to the tracking/detection result corresponding to the current frame image 110. In an example, the detected target candidate area (the final anchor) 170 is added as a new target template to the target memory. The target memory 131 may be updated in this manner, and the updated target memory 131 may be used to detect and/or track the target object in a subsequent frame image.

In an example, detecting the target object from the frame image includes detecting the target object from the frame image based on the target template set and an interference template set. The interference template set includes one or more interference templates. Each of the one or more interference templates includes information pertaining to an interference object that interferes with the detection of the object among previous frame images of a subject frame image of the video.

In an example, the detecting of the target object from the frame image includes obtaining one or more target candidate areas based on the target template set, determining one target area from among the one or more target candidate areas based on the interference template set, and detecting the target object based on the target area.

Optionally, when detecting the target object from a current frame image, one or more target candidate areas corresponding to the current frame image may be obtained according to the target template set and the interference template set, and the detailed process may be as follows.

A backbone network may extract image features from a target template set and an interference template set in a memory pool. A recall network may obtain an integration template in which features are integrated, from the extracted image features. When detecting the target object in the current frame image, several search area boxes may be obtained by searching several areas of the current frame image. Then, the respective search area boxes may be matched to the integration template, and one or more target candidate areas with relatively high matching degrees may be obtained. Then, one target area may be finally selected from among the one or more target candidate areas, and a result of detecting the target object corresponding to the current frame image may be obtained based on the selected target area.

Optionally, in target tracking in a neural network model, an interference memory may be implemented in addition to the target memory, and the detailed process may be as follows.

In a first operation, a first frame image may be selected from a video sequence.

In a second operation, a user may indicate a target in the first frame image. According to the indication, image features of an image area in which the target object is positioned may be extracted from the first frame image. An initial target template is obtained from the extracted image features. The initial target template is added to a target template set. An interference template set is empty.

In a third operation, a second frame image of the video sequence may be selected. Based on the initial target template included in the target template set, a target position of the target object in the second frame image is predicted, and a prediction result is output.

In a fourth operation, based on the prediction result, tracking information such as the target position of the target object in the second frame image, a prediction confidence, and the like is output.

In a fifth operation, whether the prediction result for the second frame image satisfies a memory update condition is determined. If the memory update condition is satisfied, the target template set is updated; otherwise, the target template set is not updated. In an example, if the memory update condition is satisfied, a target template corresponding to the second frame image may be added to the target template set.

In a sixth operation, a third frame image of the video sequence may be selected. At this time, the target template set and the interference template set may be loaded from the memory pool, according to the target template set and the interference template set.

In a seventh operation, a target position of the target object in a subsequent frame image is predicted based on the target template set and the interference template set, and a prediction result is output. Then, the process is performed on subsequent frames in the same manner.

The above method will be described in more detail with reference to the example of FIG. 2.

Figure 2:
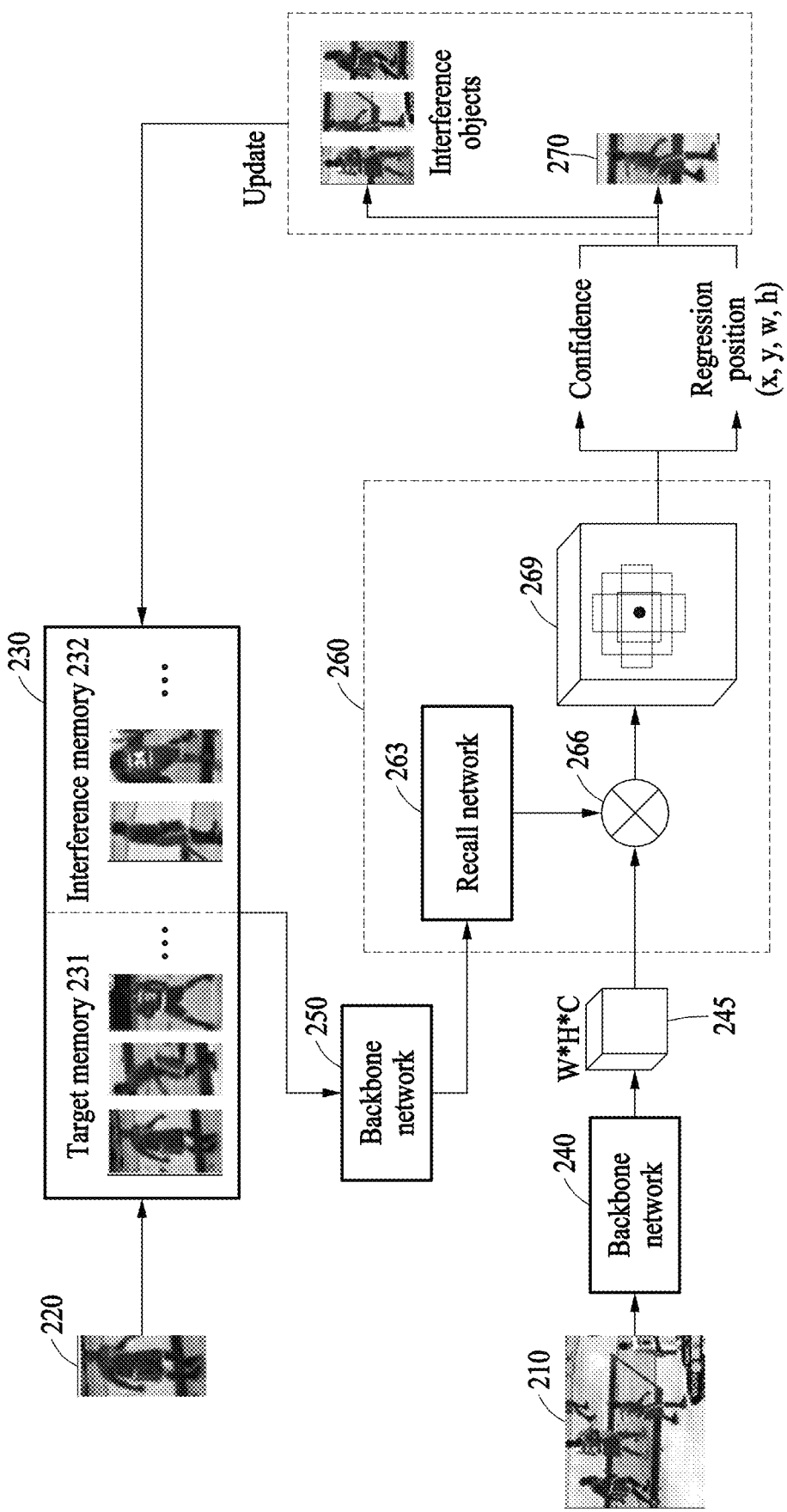
FIG. 2 illustrates an example of an object tracking method, in accordance with one or more embodiments.

FIG. 2 illustrates an example of a neural network model implementing an object tracking method, in accordance with one or more embodiments.

Referring to FIG. 2, a target object to be tracked is, in an example, a predetermined player (referred to as a "target player"). A current frame image 210 may be a frame image in a video in which the target player is to be detected. In the example of FIG. 2, when a user finds a target object (e.g., the target player) during the playback of the video, the user may indicate or select the target object in a frame image. Then, information of a portion (the portion including the target object) of the frame image may be used as an initial target template 220.

A memory pool 230 may include a target memory 231 and an interference memory 232. The target memory 131 may be a storage space that stores a target template set. The interference memory 232 may be a storage space that stores an interference template set.

The target template set stores target templates corresponding to frame images previous to the current frame image 210. The target templates are information regarding, or pertaining to, the target object in the frame images of the video. In an example, the target templates may be image areas including the target object, or may be feature information of the image areas. The target template set may further store the initial target template 220.

The interference template set stores interference templates corresponding to the frame images previous to the current frame image 210. The interference templates are information regarding an interference object that interferes with the detection of the target object in the frame images of the video. In an example, the interference templates may be image areas including the interference object, or may be feature information of the image areas.

In an example, to detect a target object in the current frame image 210, an entirety or a portion (a search area) of the current frame image 210 is input to a backbone network 240. The backbone network 240 may extract a search area feature by implementing a neural network. The search area feature is an image feature corresponding to the search area. In an example, the backbone network 240 may output W×H×C as search area features 245 corresponding to the search areas of the current frame image 210. W×H×C is a feature map, where W and H respectively denote the width and height of the feature map, and C denotes the number of channels (i.e., the number of features) of the feature map.

To obtain one or more target candidate areas, the target template set stored in the target memory 231 and the interference template set stored in the interference memory 232, of the memory pool 230, may be input to a backbone network 250. The backbone network 250 extracts image features corresponding to the respective target templates in the target template set, and extracts image features corresponding to the respective interference templates in the interference template set. These image features are input to a recall network 263 of a processor 260.

In an example, the processor 260 may include the recall network 263, a correlation calculator 266, and an anchor processor 269. The recall network 263, the correlation calculator 266, and the anchor processor 269 are conceptually divided by respective functions, and are not necessarily implemented to be physically separate. In an example, the recall network 263, the correlation calculator 266, and the anchor processor 269 may all be different functions processed by the processor 260, and are divided for ease of description.

The recall network 263 may output an integrated target feature by integrating image features of image areas respectively corresponding to the target templates included in the target template set. Further, the recall network 263 may output an integrated interference feature by integrating image features of image areas respectively corresponding to the interference templates included in the interference template set. The recall network 263 is a network that integrates input image features by implementing a neural network, and may include a Fusion Feature Convolutional Neural Network (FFCNN) and the like, but is not limited thereto.

In an example, the integrated target feature may be determined by integrating image features of image areas respectively corresponding to target templates included in the target template set. Then, one or more target candidate areas determined to be target candidate areas including the object in the frame image may be obtained based on the integrated target feature. One target area may be determined from among the one or more target candidate areas.

In an example, the correlation calculator 266 calculates correlations between the search area features 245 respectively corresponding to the plurality of search areas of the current frame image 210 and a target feature kernel (e.g., the integrated target feature). According to the correlations, one or more candidate anchors (target candidate areas) are determined from among the search areas. In an example, K candidate anchors (target candidate areas) having large correlation values may be selected and recorded as Top-K candidate anchors (target candidate areas).

In an example, the correlation calculator 266 may also calculate correlations between the search area features 245, respectively corresponding to the search areas, and an interference feature kernel (e.g., the integrated interference feature). According to the correlations, one candidate anchor (target candidate area) having the lowest correlation (or matching degree) may be selected from among the search areas. The selected candidate anchor (target candidate area) is recorded as a Bottom-1 candidate anchor.

The correlations calculated by the correlation calculator 266 are input to the anchor processor 269. The anchor processor 269 may output confidences and/or regression results respectively for the one or more target candidate areas (candidate anchors). In an example, the regression results may include a regression position (x, y, w, h). In an example, x and y may denote horizontal and vertical coordinates of a particular point in a corresponding target candidate area. Based on this, a position and a confidence of the target object in the current frame image 210 may be determined.

According to the confidences and/or the regression results of the target candidate areas, one target candidate area (final anchor) 270 may be selected from among the plurality of target candidate areas (candidate anchors).

Additionally, the target memory 231 and the interference memory 232 may also be updated according to a tracking result. In an example, the detected target candidate area (the final anchor) 270 may be added as a new target template to the target memory 231. Additionally, a portion, or all, of a plurality of target candidate areas (candidate anchors) except for the finally selected target candidate area (the final anchor) 270 may be added to the interference memory 232. In an example, a candidate anchor having a lowest matching degree to the final anchor 270 may be added to the interference memory 232.

Figure 3:
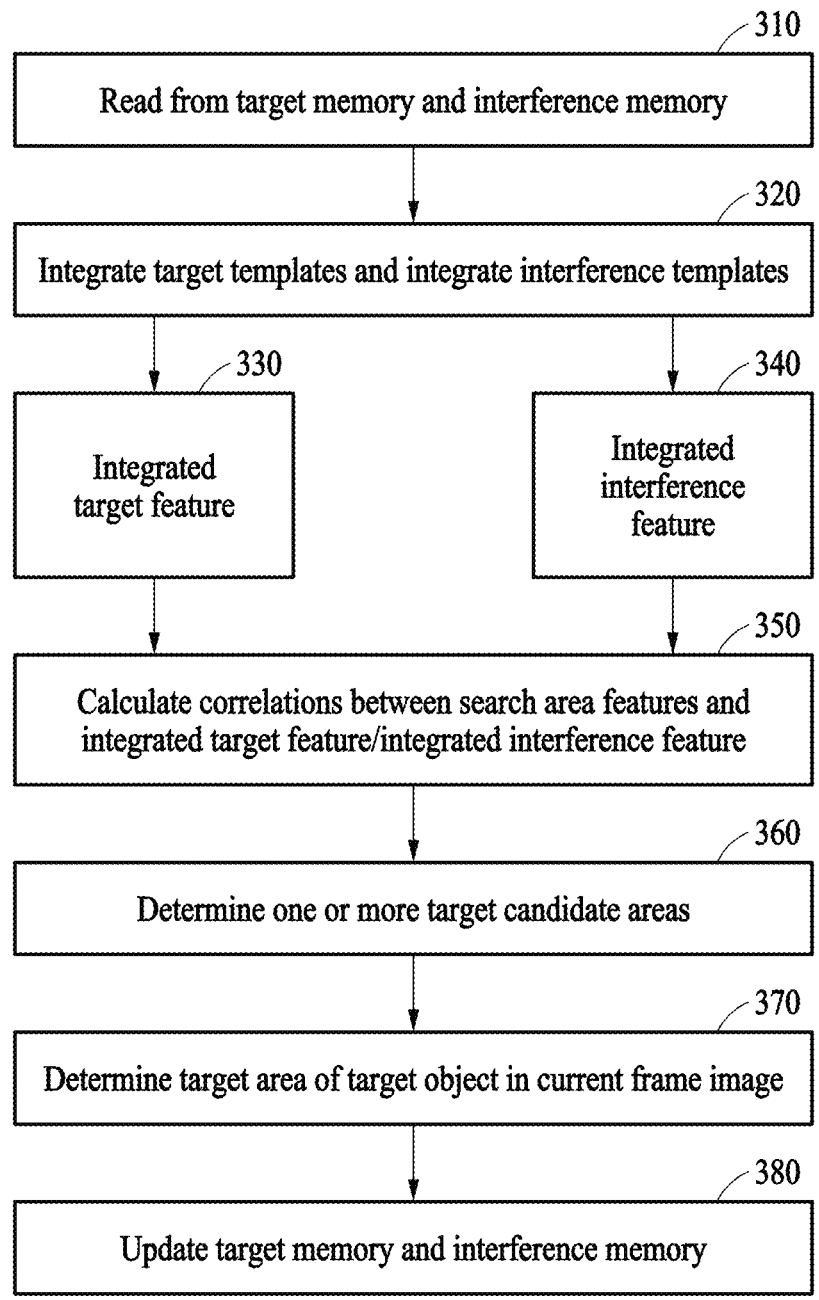
FIG. 3 is a flowchart illustrating an example of an object tracking method, in accordance with one or more embodiments.

FIG. 3 is a flowchart illustrating an example of the object tracking method of FIG. 2. Referring to FIG. 3, the object tracking method of FIG. 2 will be described. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1 and 2 are also applicable to FIG. 3, and are incorporated herein by reference. Thus, the above description may not be repeated here.

In operation 310, the target template set and the interference template set are read from the target memory 231 and the interference memory 232, respectively.

In operation 320, the recall network 263 outputs an integrated target feature (also referred to as a "target feature kernel") 330 by integrating image features of image areas respectively corresponding to the target templates included in the target template set. Additionally, the recall network 263 outputs an integrated interference feature (also referred to as an "interference feature kernel") 340 by integrating image features of image areas respectively corresponding to the interference templates included in the interference template set.

In operation 350, the correlation calculator 266 calculates correlations between the search area features 245 respectively corresponding to the plurality of search areas in the current frame image 210 and the integrated target feature (the target feature kernel). Further, the correlation calculator 266 calculates correlations between the search area features 245 respectively corresponding to the plurality of search areas and the integrated interference feature (the interference feature kernel).

In operation 360, one or more target candidate areas are determined from among the plurality of search areas, according to results of calculating the correlations in operation 350.

In operation 370, one target candidate area (the final anchor) 270 is selected from among the one or more target candidate areas (candidate anchors), according to confidences and/or regression results of the one or more target candidate areas. That is, one target area determined to be a target area including the target object in the current frame image 210 is determined. This is construed as the same operation as determining the position of the target object in the current frame image 210.

In operation 380, the target memory 231 and the interference memory 232 are updated according to detection results.

Figure 4:
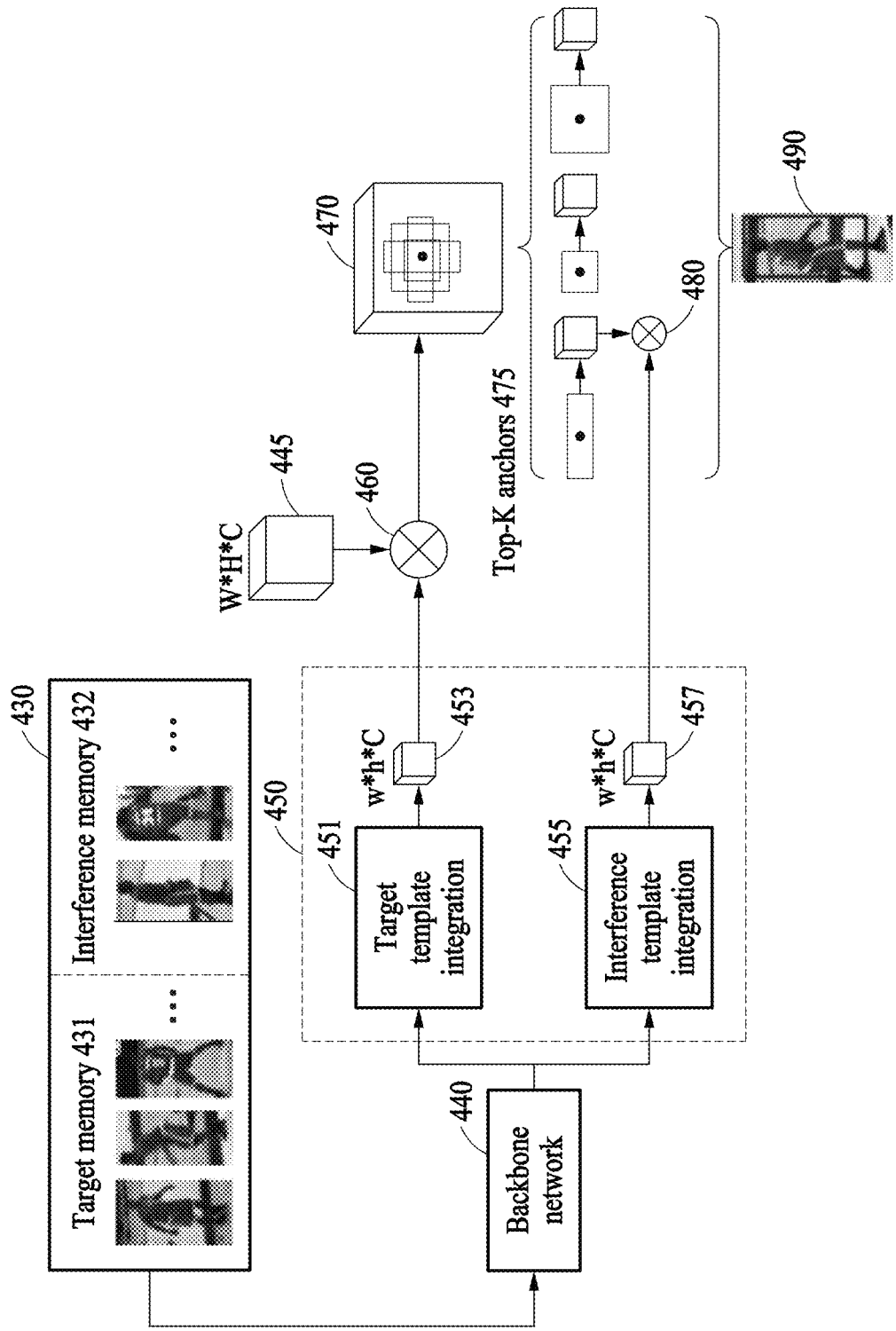
FIG. 4 illustrates an example of memory matching in an object tracking method, in accordance with one or more embodiments.

FIG. 4 illustrates an example of memory matching in an object tracking method, in accordance with one or more embodiments.

Referring to FIG. 4, a memory pool 430 may include a target memory 431 and an interference memory 432. The target memory 431 may store a target template set. The interference memory 432 may store an interference template set. The target template set stored in the target memory 431 and the interference template set stored in the interference memory 432, of the memory pool 430, are input to a backbone network 440.

The backbone network 440 may extract image features corresponding to respective target templates in the target template set. The backbone network 440 may extract image features corresponding to respective interference templates in the interference template set.

The recall network 450 may generate an integrated target feature 453 by integrating image features corresponding to the target templates received from the backbone network 440 in operation 451. The recall network 450 may generate an integrated interference feature 457 by integrating image features corresponding to the interference templates received from the backbone network 440 in operation 455.

The correlation calculator 460 may calculate correlations between search area features 445 respectively corresponding to a plurality of search areas in a current frame image and the integrated target feature 453. Further, the correlation calculator 460 may calculate correlations between the search area features 445 respectively corresponding to the plurality of search areas and the integrated interference feature 457.

The correlations calculated by the correlation calculator 460 may be input to an anchor processor 470. The anchor processor 470 may output one or more anchors based on matching degrees, for example, by implementing a neural network. The anchor processor 470 may select K anchors (search areas) based on the correlations between the search area features 445 corresponding to the respective search areas output by the correlation calculator 460 and the integrated target feature 453. In an example, K anchors (search areas) having relatively high matching degrees may be selected according to the matching degrees based on the correlations. K may be an integer greater than or equal to "1" and may be selected according to an example. In an example, K may be "3". The selected K anchors may be stored as Top-K anchors 475. The Top-K anchors 475 become target candidate areas.

In an example, the correlation calculator 480 may calculate correlations between the respective Top-K anchors 475 (or feature information respectively corresponding to the Top-K anchors 475) and the integrated interference feature 457. Matching degrees of the target candidate areas 475 to the integrated interference feature 457 are calculated by the correlation calculator 480. From among the target candidate areas 475, one target candidate area (candidate anchor) having a lowest matching degree to the integrated interference feature 457 may be selected as a Bottom-1 anchor. The selected Bottom-1 anchor is determined to be a target area 490 of the target object. The target area corresponds to a position at which the target object is determined to be in the current frame image.

Based on a confidence and/or a regression result of the selected target area 490, a detection confidence for the target object in the current frame image is calculated.

The configurations shown in FIGS. 1, 2 and 4 are provided for the purpose of description. Examples are not limited to the configurations. In an example, the target templates stored in the target memory 131, 231, 431 and the interference templates stored in the interference memory 232, 432, of the memory pool 130, 230, 430 of FIGS. 1, 2 and 4 are provided as examples, and may be updated according to subsequent frames of the video. The example of FIG. 1 and the example of FIG. 2 differ in that the example of FIG. 1 uses the target memory (or the target templates) to detect the target object, while the example of FIG. 2 uses the target memory (or the target templates) and the interference memory (or the interference templates) together to detect the target object.

Through the examples, the target object may be detected based on the target memory and/or the interference memory. Implementing these examples may more comprehensively record various changes in the target object when the target object moves and effectively improve the detection accuracy.

In an example, determining the one target area from among the one or more target candidate areas may include calculating matching degrees of the one or more target candidate areas to each target template of the target template set, calculating matching degrees of the one or more target candidate areas to each interference template of the interference template set, calculating target matching degrees of the target candidate areas based on the matching degrees of the target candidate areas to each target template of the target template set and the matching degrees of the target candidate areas to each interference template of the interference template set, and determining one target area from among the one or more target candidate areas based on the target matching degrees of the target candidate areas.

In this example, the matching degrees between the respective target candidate areas and each target template may be obtained and recorded as first matching degrees. For a predetermined target candidate area, a matching degree between the target candidate area and each interference template of the interference template set may be calculated, such that a plurality of matching degrees between the target candidate area and the interference templates may be obtained. A mean value or (median value) of the plurality of matching degrees is selected as a matching degree between the target candidate area and the interference templates. A matching degree between each target candidate area and each interference template may be calculated and recorded as a second matching degree. By subtracting a value of the first matching degree and a value of the second matching degree by 1:1, a first target matching degree may be calculated. A target candidate area having a largest value of the first target matching degree may be identified as a target area.

In an example, according to the matching degrees, a target candidate area having a high matching degree to the target memory and a low matching degree to the interference memory may be identified as the target area. This may allow an object most similar to the target templates and simultaneously least affected by the interference templates to be selected as a target object that is currently tracked. Accordingly, the accuracy of detecting the target object improves.

In an example, results of detecting the target object may be obtained using the respective target templates in the target template set and the respective interference templates in the interference template set. Specifically, one or more target candidate areas may be obtained by one-to-one matching the respective target templates in the target template set and the respective interference templates in the interference template set to a plurality of search area boxes corresponding to a portion of a frame image. Then, one target area corresponding to the target object may be selected from among the one or more target candidate areas, and a result of detecting the target object may be obtained based on the target area.

The above description is only an example, and the examples are not limited thereto.

Figure 5:
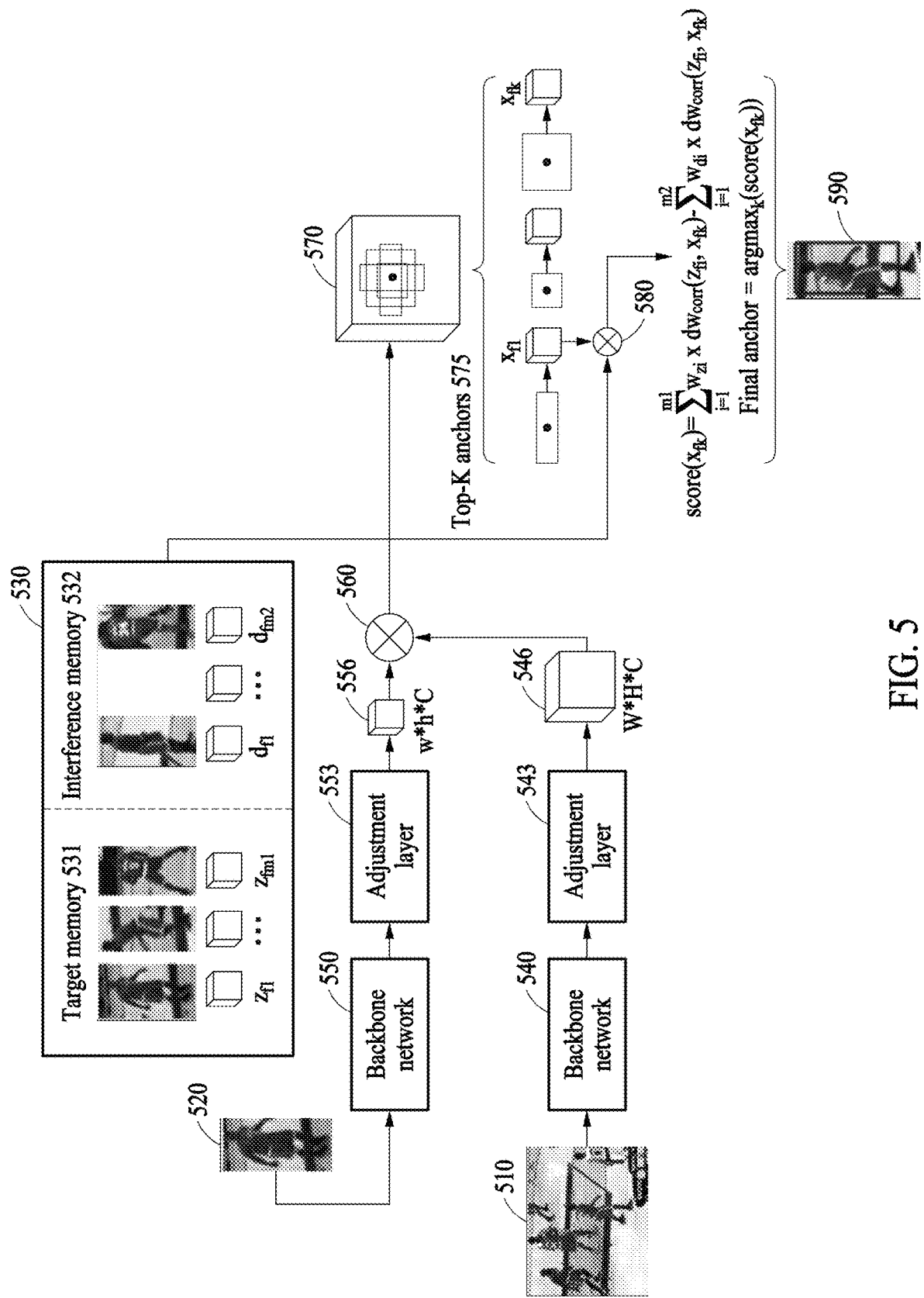
FIG. 5 illustrates an example of a light-weight object detection method, in accordance with one or more embodiments.

FIG. 5 illustrates an example of a light-weight object detection method, in accordance with one or more embodiments.

Referring to FIG. 5, a memory pool 530 may include a target memory 531 and an interference memory 532. The target memory 531 may store a target template set. The interference memory 532 may store an interference template set. In this example, target templates included in the target template set are each a feature vector of a subject image area. That is, in FIG. 5, $z_{fi}$ denotes a feature vector of an i-th target template in the target template set stored in the target memory 531. Further, interference templates included in the interference template set are each a feature vector of a subject image area. That is, in FIG. 5, $d_{fi}$ denotes a feature vector of an i-th interference template in the interference template set stored in the interference memory 532.

In the example of FIG. 5, a target template corresponding to a first frame image may not be stored in the target memory 531 but may be separately input. By processing a template image 520 extracted from the first frame image through a backbone network 550 and an adjustment layer 553, an initial target template 556 may be obtained.

According to an example, the template image 520 extracted from the first frame image may be an image of a search area (image area) determined by a user to be a search area including a target object among frame images of a video. According to another example, the first frame image may be an image including the target object, and a separate image independent of the video. A target template, as described above, represents an image feature of a subject image.

A plurality of search areas may be selected from a current frame image 510. The plurality of search areas may be a plurality of areas into which the current frame image 510 is divided. A portion of the plurality of search areas may overlap each other. When a target area of the target object is determined in a previous frame, a plurality of search areas may be determined in a current frame based on a position of the target area in the previous frame. By processing each of the plurality of search areas through a backbone network 540 and an adjustment layer 543, search area features 546 corresponding to the search areas may be obtained.

The backbone network 540, and the backbone network 550 may be networks that extract features of an image by implementing a neural network, and may include, as non-limiting examples, MobileNet, ResNet, Xception Network, and the like. In FIG. 5, feature information output by the backbone network may be adjusted by the adjustment layer 553, 543, but may be omitted according to an example. The adjustment layer 553, 543 may extract only a portion of the feature information output by the backbone network or adjust a value of the feature information.

A correlation calculator 560 may calculate correlations between the search area features 546 corresponding to the search areas and an initial target template 556. In an example, the correlation calculator 560 may calculate the correlations using a depthwise correlation method.

The correlations calculated by the correlation calculator 560 may be input to an anchor processor 570. The anchor processor 570 selects K anchors (search areas) having relatively high matching degrees as Top-K anchors 575, according to matching degrees based on the correlations. The selected anchors (search areas) are identified as target candidate areas.

For each of the K target candidate areas 575, a score according to Equation 1 below may be calculated, for example, by a computing function 580.

$$\text{score}(x_{fk}) = \sum_{i=1}^{m1} w_{zi} \times dw_{corr}(z_{fi}, x_{fk}) - \sum_{i=1}^{m2} w_{di} \times dw_{corr}(d_{fi}, x_{fk}) \quad \text{Equation 1}$$

In an example, $z_{fi}$ denotes a feature vector of an i-th target template in a target template set stored in a target memory. $d_{fi}$ denotes a feature vector of an i-th interference template in an interference template set stored in an interference memory. $x_{fk}$ denotes a feature vector of a k-th target candidate area (anchor) among the K target candidate areas (Top-K anchors). $dw_{corr}(z_{fi}, x_{fk})$ denotes a matching value obtained by calculating a correlation between $z_{fi}$ and $x_{fk}$. $w_{zi}$ denotes a weight of the i-th target template in the target template set stored in the target memory. $w_{di}$ denotes a weight of the i-th interference template in the interference template set stored in the interference memory. m1 denotes the number of target templates included in the target template set, and m2 denotes the number of interference templates included in the interference template set.

Then, a target candidate area having a largest score calculated by Equation 1 is selected as a target area (final anchor) 590. This may be expressed by Equation 2 below.

$$\text{Final anchor} = \text{argmax}_k(\text{score}(x_{fk})) \quad \text{Equation 2:}$$

Through Equations 1 and 2, a target candidate area that is most similar to the target templates included in the target template set and least similar to the interference templates included in the interference template set is selected as the target area (final anchor).

The number of target templates, m1, and the number of interference templates, m2, may vary according to a current frame image in which the target object is to be identified.

In an example, the sum of weights of all target templates in the target template set may be "1", and a weight of the initial target template may be set to be the highest. However, a method of setting the weights of the target templates is not limited thereto, and the weights of the target templates may be set by various methods.

In an example, the sum of weights of all interference templates in the interference template set may be "1", and a weight of each interference template may be set according to a distance between an image area in which each interference template is positioned and an image area in which the target object is positioned. However, a method of setting the weights of the interference templates is not limited thereto, and the weights of the target templates may be set by various methods.

In an example, an image feature (initial target template) corresponding to a first frame image may be extracted, and then, this initial target template may be stored in the target memory 531. Thereafter, the initial target template may be loaded from the target memory 531 and used.

Figure 6:
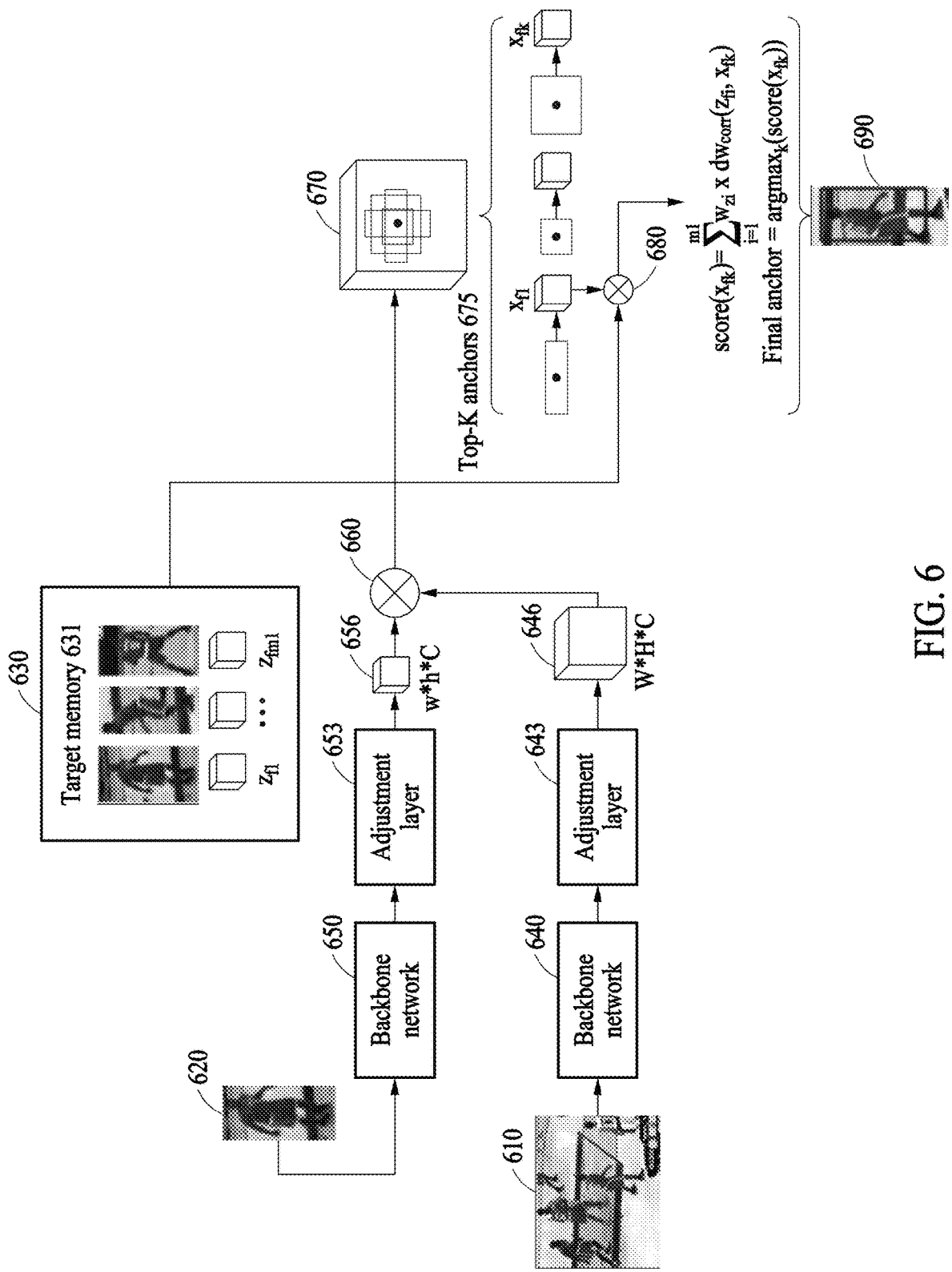
FIG. 6 illustrates an example of a light-weight object detection method, in accordance with one or more embodiments.

FIG. 6 illustrates an example of a light-weight object detection method, in accordance with one or more embodiments.

Referring to FIG. 6, a memory pool 630 may include only a target memory 631 and may not include an interference memory. The target memory 531 may store a target template set. In this example, target templates included in the target template set are each a feature vector of a subject image area. That is, in FIG. 6, $z_{fi}$ denotes a feature vector of an i-th target template in the target template set stored in the target memory 631.

A plurality of search areas may be selected from a current frame image 610. Each of the plurality of search areas may be processed through a backbone network 640 and an adjustment layer 643, and search area features 646, corresponding to the search areas, may be obtained.

An initial image 620 including a target object may be processed through a backbone network 650 and an adjustment layer 653, and an image feature 656 corresponding to the initial image 620 may be obtained. This image feature 656 may be used as an initial target template.

A correlation calculator 660 may calculate correlations between the search area features 646 corresponding to the search areas and the initial target template 656. The correlations calculated by the correlation calculator 660 are input to an anchor processor 670. The anchor processor 670 selects K anchors (search areas) having relatively high matching degrees as Top-K anchors 675 based on the correlations. The selected anchors (search areas) are identified as target candidate areas.

For each of the K target candidate areas 675, a score according to Equation 3 below is calculated, for example, by a computing function 680.

$$\text{score}(x_{fk}) = \sum_{i=1}^{m1} w_{zi} \times dw_{corr}(z_{fi}, x_{fk})$$

Equation 3

Here, $z_{fi}$ denotes a feature vector of an i-th target template in a target template set stored in a target memory. $x_{fk}$ denotes a feature vector of a k-th target candidate area (anchor) among the K target candidate areas (Top-K anchors). $dw_{corr}(z_{fi}, x_{fk})$ denotes a matching value obtained by calculating a correlation between $z_{fi}$ and $x_{fk}$. $w_{zi}$ denotes a weight of the i-th target template in the target template set stored in the target memory. m1 denotes the number of target templates included in the target template set.

Then, a target candidate area (Top-1 anchor) having a largest score calculated by Equation 3 is selected as a target area (final anchor) 690. This may be expressed by Equation 4 below.

Final anchor=argmax$_k$(score($x_{fk}$))

Equation 4:

In an example, the initial target template may be replaced with an integrated template of all or a portion of the target templates included in the target template set, unlike the above description.

A method according to an example may determine an integrated target feature by integrating image features of image areas respectively corresponding to the target templates included in the target template set, and obtain one or more target candidate areas determined to be target candidate areas including the object in the frame image based on the integrated target feature. Then, one target area is determined from the one or more target candidate areas.

Obtaining the one or more target candidate areas may include determining a plurality of search areas within the frame image, obtaining search area features by extracting respective image features of the plurality of search areas, calculating correlations between the search area features of the plurality of search areas and the integrated target feature, and determining the one or more target candidate areas from among the plurality of search areas based on the correlations.

In an example, the following method may be used to determine a target area from among one or more target candidate areas. For a predetermined target candidate area, a plurality of matching degrees may be obtained by calculating matching degrees to the respective target templates of the target template set. A mean value of the plurality of matching degrees may be taken as a matching degree between the subject target candidate area and the target templates. Finally, a target candidate area having a highest matching degree among the target candidate areas is taken as a final target area.

In an example, the method may further include updating the target template set when the final target area satisfies a predetermined condition.

Updating the target template set may include calculating a similarity of the final target area to the integrated target feature of the target template set, and adding the final target area as a target template to the target template set in response to the similarity being less than a threshold.

Updating the target template set may include calculating similarities of the final target area to all target templates of the target template set, and adding the final target area as a target template to the target template set in response to all the similarities being less than a threshold.

Optionally, similarities between the final target area and the respective target templates in the target template set may be calculated. When all of the calculated similarities are less than or equal to a set threshold (e.g., 0.9), a target template corresponding to the final target area may be added to the target template set. Alternatively, if an integrated similarity corresponding to the calculated similarities (e.g., the mean value of the calculated similarities) is less than or equal to the set threshold (e.g., 0.9), the target template corresponding to the final target area may be added to the target template set.

Accordingly, if the final target area is similar to the target templates included in the existing target template set, the final target area is not added to the target template set. This is because the final target area similar to the already included target templates would not significantly improve the performance of the existing target template set. Additionally, since the target template set may include a latest feature of the target object through the update of the target template set, the target template set may have improved integrity.

In an example, the method may further include updating the interference template set.

In an example, a portion, or all, of the other target candidate areas except for the final target area among the one or more target candidate areas, may be added as interference templates to the interference template set. In an example, image areas (or image features of the image areas) corresponding to anchors other than a Bottom-1 anchor among Top-K anchors may be selected as the interference templates.

According to an alternative example, for a portion, or all, of the other target candidate areas except for the final target area among the one or more target candidate areas, similarities to an integrated interference feature of the interference template set are calculated. Target candidate areas whose calculated similarities are less than a threshold may be added as interference templates to the interference template set. Accordingly, when a candidate interference area selected as a candidate interference area to be added to the interference template set is similar to the interference templates included in the existing interference template set, the candidate interference area may not be added to the interference template set. This is because the candidate interference area, which may be similar to the already included interference templates, would not significantly improve the performance of the existing interference template set.

In an example, a target area in which the target object is positioned, and candidate interference areas (image areas) in which possible interference objects for the target object are positioned, may be obtained in the frame image. For a candidate interference area in which a possible interference object is positioned, a first similarity between the candidate interference area and the target area, and second similarities between the candidate interference area and the respective interference templates in the interference template set may be determined. A determination may be made whether to update the interference template set based on first and second similarities for each candidate interference area in which a possible interference object is positioned.

In an example, for an image area (candidate interference area) in which a predetermined possible interference object is positioned, a first similarity between the image area and the target area (the first similarity may indicate a distance between the image area and the target area) may be determined, and second similarities between the image area and the respective interference templates in the interference template set (the second similarities may indicate similarities between the image area and the respective interference templates) may be determined. Then, based on the first and second similarities, a candidate interference area to be added to the interference template set may be determined from among the candidate interference areas. In an example, a candidate interference area having a relatively large first similarity and a relatively small second similarity may be selected as a candidate interference area to be added to the interference template set.

Hereinafter, updating the target memory and/or the interference memory will be described with reference to the drawings.

Figure 7:
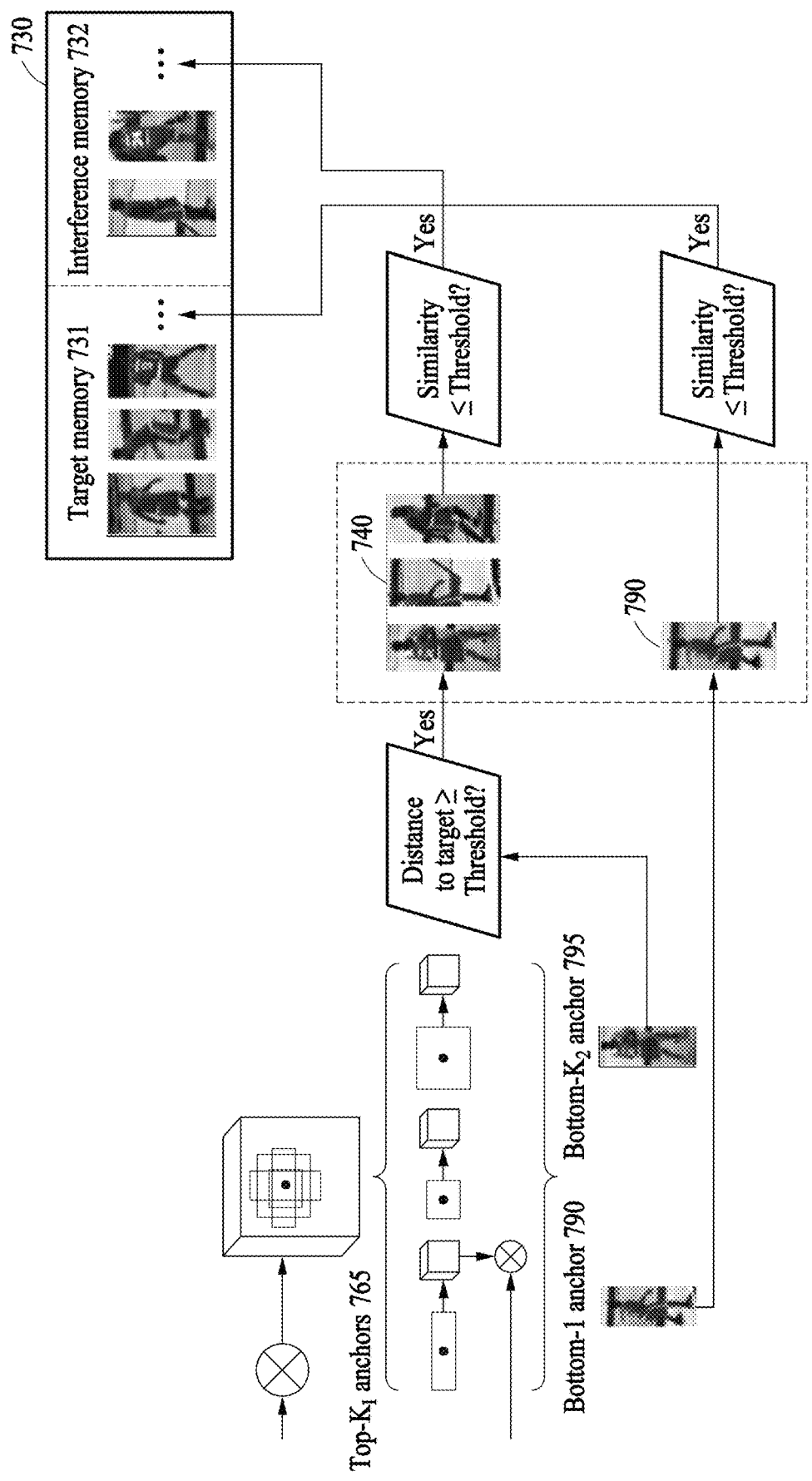
FIG. 7 illustrates an example of a memory update, in accordance with one or more embodiments.

FIG. 7 illustrates an example of a memory update, in accordance with one or more embodiments.

As illustrated in FIG. 7, a finally selected Bottom-1 anchor 790 is information regarding an image area in which a target object is determined to be positioned in a current frame image. That is, the Bottom-1 anchor 790 is a target area (final anchor). The Bottom-1 anchor 790 may be an image area or a feature map representing image features of the image area, but is not limited thereto.

A result of detecting the target object (e.g., the Bottom-1 anchor 790) is compared with target templates in a target template set stored in a target memory 731. It is determined whether a similarity between the result of detecting the target object and the target template set is less than a threshold. In an example, similarities between all the target templates in the target template set and the target area 790 are calculated. In another example, a similarity between an integrated target feature of the target template set and the target area is calculated. Specifically, a determination may be made with regard to how similar the detected target area 790 is to the target templates already stored in the target memory 731. If the similarities are less than a threshold (e.g., 90%), the target template set stored in the target memory 731 is updated based on the detected target area 790. In an example, the detected target area 790 is added as a new target template to the target template set. If the similarities are greater than or equal to the threshold (e.g., 90%), the target memory 731 is not updated.

From among Top-$K_1$, candidate anchors 765, Bottom-$K_2$ candidate anchors 795 of the remaining anchors except for the Bottom-1 anchor 790 selected as the target area are selected as candidate interference anchors. To find the Bottom-1 anchor 790 among the Top-$K_1$, candidate anchors 765, matching degrees to the Top-$K_1$, candidate anchors 765 may be calculated using the target template set and an interference template set. An anchor having a greatest matching degree is selected as the Bottom-1 anchor 790 from among the Top-$K_1$, candidate anchors 765. Then, $K_2$ anchors having relatively small matching degrees are determined to be the Bottom-$K_2$ candidate anchors 795 from among the Top-$K_1$, candidate anchors 765.

A distance between each of the candidate interference anchors 795 and a position of the target object (target area) detected in a current frame image is calculated. A determination is made whether the distance between a candidate interference anchor 795 and the position of the target object is greater than a threshold. If the distance is greater than the threshold, the corresponding candidate interference anchor may be added as an interference object 740. If the distance is less than the threshold, the corresponding candidate interference anchor is considered not to be an interference object, and information regarding the candidate interference anchor is discarded.

The selected interference object 740 is compared to interference templates of an interference template set stored in an interference memory 732. determination is made whether a similarity between the interference object 740 and the interference template set is less than a threshold. In an example, similarities between all the interference templates in the interference template set and the interference object 740 are calculated. In another example, a similarity between an integrated interference feature of the interference template set and the interference object 740 is calculated. Specifically, a determination is made with regard to how similar the detected interference object 740 is to the interference templates already stored in the interference memory 732. If the similarities are less than a threshold (e.g., 90%), the interference template set stored in the interference memory 732 is updated based on the detected interference object 740. In an example, the detected interference object 740 may be added as a new interference template to the interference template set. If the similarities are greater than or equal to the threshold (e.g., 90%), the interference memory 732 may not be not updated.

In an example, the target template set and the interference template set may be maintained or updated according to the result of detecting the target object. That is, by maintaining the target memory and the interference memory up to date, a variety of enriched information may be provided for detection of a subsequent target object, and the detection accuracy may improve.

Table 1 below illustrates success rates and accuracies of object detection/tracking when neither the target memory nor the interference memory is used (when neither the target template set nor the interference memory is used) (Example 1), when only the target memory is used (when only the target template set is used) (Example 2), and when both the target memory and the interference memory are used (when both the target template set and the interference template set are used) (Example 3).

TABLE 1

| Video sequence name | Example 1 | | Example 2 | | Example 3 | |
|---|---|---|---|---|---|---|
| | Success rate | Accuracy | Success rate | Accuracy | Success rate | Accuracy |
| Video sequence 1 | 0.589 | 0.662 | 0.742 | 0.830 | 0.741 | 0.833 |
| Video sequence 2 | 0.573 | 0.410 | 0.565 | 0.524 | 0.534 | 0.556 |
| Video sequence 3 | 0.132 | 0.299 | 0.146 | 0.365 | 0.163 | 0.414 |

As illustrated in Table 1, when only the target memory is used (when only the target template set is used) (Example 2) and when both the target memory and the interference memory are used (when both the target template set and the interference template set are used) (Example 3), the success rates and the accuracies improved when compared to when neither the target memory nor the interference memory is used (when neither the target template set nor the interference memory is used) (Example 1). Additionally, when both the target memory and the interference memory are used (when both the target template set and the interference template set are used) (Example 3), the accuracy is improved when compared to an example when only the target memory is used (when only the target template set is used) (Example 2).

Figure 8:
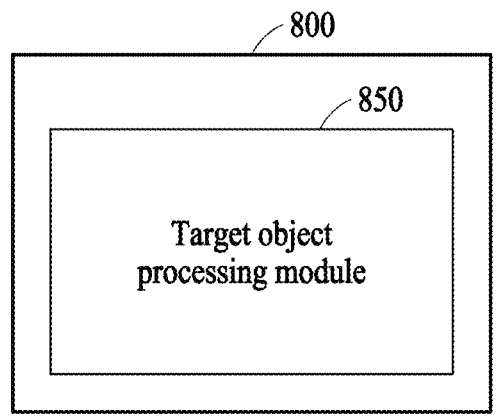
FIG. 8 is a block diagram illustrating an example of an object detection apparatus, in accordance with one or more embodiments.

FIG. 8 is a block diagram illustrating an example of an object detection apparatus, in accordance with one or more embodiments.

In an example, an object detection apparatus 800 may be implemented as an electronic device including a memory and a processor. The object detection apparatus 800 may include a target object processing module 850 that detects an object from a frame image of a video including a plurality of frame images.

The object detection apparatus 800 may detect the object from the frame image based on a target template set, and output information pertaining to the detected object.

The object detection apparatus 800 may determine an integrated target feature by integrating image features of image areas respectively corresponding to target templates included in the target template set, and obtain one or more target candidate areas determined to be target candidate areas including the object in the frame image based on the integrated target feature. The object detection apparatus 800 may determine one target area from among the one or more target candidate areas.

The object detection apparatus 800 may determine a plurality of search areas within the frame image, and obtain search area features by extracting respective image features of the plurality of search areas. The object detection apparatus 800 may calculate correlations between the search area features of the plurality of search areas and the integrated target feature, and determine the one or more target candidate areas from among the plurality of search areas based on the correlations.

The object detection apparatus 800 may calculate a similarity of the target area to the integrated target feature of the target template set. The object detection apparatus 800 may update the target template set by adding the target area as a target template to the target template set in response to the similarity being less than a threshold.

The object detection apparatus 800 may calculate similarities of the target area to all target templates of the target template set. The object detection apparatus 800 may update the target template set by adding the target area as a target template to the target template set in response to all the similarities being less than a threshold.

The object detection apparatus 800 may obtain one or more target candidate areas determined to be those including the object in the frame image, based on the target template set and an interference template set. The object detection apparatus 800 may determine one target area from among the one or more target candidate areas.

The object detection apparatus 800 may calculate matching degrees of the one or more target candidate areas to each target template of the target template set. The object detection apparatus 800 may calculate matching degrees of the one or more target candidate areas to each interference template of the interference template set. The object detection apparatus 800 may calculate target matching degrees of the target candidate areas based on the matching degrees of the target candidate areas to each target template of the target template set and the matching degrees of the target candidate areas to each interference template of the interference template set. The object detection apparatus 800 may determine one target area from among the one or more target candidate areas based on the target matching degrees of the target candidate areas. In an example, when calculating the target matching degrees of the target candidate areas, the object detection apparatus 800 may calculate the target matching degrees of the target candidate areas based on a mean value or a median value of the matching degrees of the target candidate areas to each target template of the target template set and/or a mean value or a median value of the matching degrees of the target candidate areas to each interference template of the interference template set.

The object detection apparatus 800 may determine an integrated target feature based on the target template set, and determine an integrated interference feature based on the interference template set. The object detection apparatus 800 may obtain the one or more target candidate areas from the frame image based on the integrated target feature and the integrated interference feature. In an example, the object detection apparatus 800 may calculate similarities of a portion or all of the other target candidate areas to the integrated interference feature of the interference template set, and add a target candidate area having a similarity less than a threshold among the portion or all of the other target candidate areas as an interference template to the interference template set.

Figure 9:
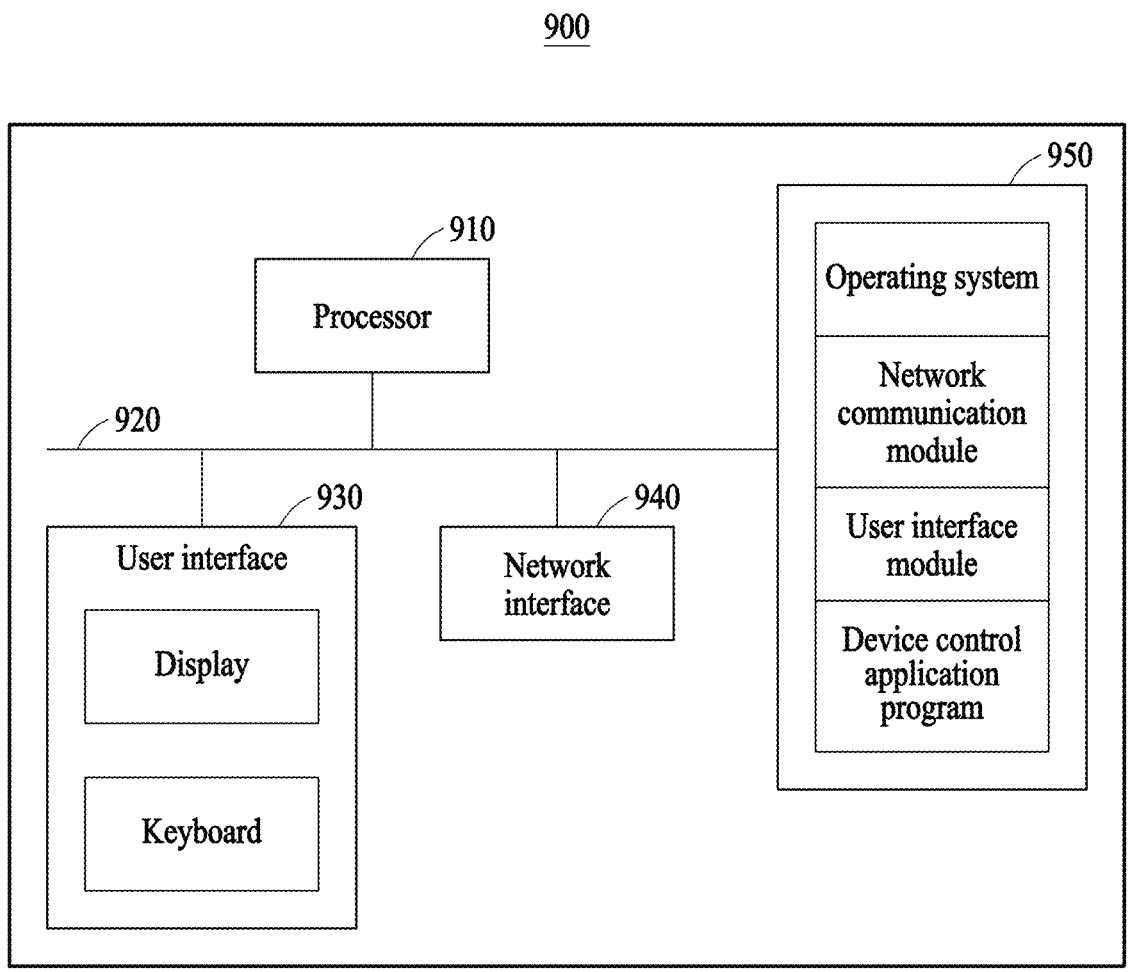
FIG. 9 is a block diagram illustrating an example of an electronic device for detecting an object, in accordance with one or more embodiments.

FIG. 9 is a block diagram illustrating an example of an electronic device that detects an object in a video image, in accordance with one or more embodiments.

An example electronic device 900 may include a processor 910, a network interface 940, and a storage 950. The electronic device 910 may further include a user interface 930 and at least one communication bus 920. The communication bus 920 may be used to implement connections and communication between these elements. The user interface 930 may include a display and a keyboard, and optionally, may further include a standard wired/wireless interface. The network interface 940 may include a standard wired interface and/or a wireless interface (e.g., a Wi-Fi interface). In a non-limited example, the storage 950 may include a high-speed random-access memory (RAM), and may also include at least one disk memory or a non-volatile memory such as a flash memory. Further, the storage 950 may be a removable storage device that is attachable to and detachable from the electronic device 900. The storage 950 may store an operating system, a network communication module, a user interface module, and a device control application program. The network interface 940 may provide a network communication function. The user interface 930 may be implemented to provide an input interface for a user. The processor 910 may be implemented to invoke the device control application program stored in the storage 950. The processor 910 may be configured to perform one or more, any combination, or all operations described with reference to FIGS. 1 to 7.

In some examples, the electronic device 900 may execute the method described with reference to FIGS. 1 to 7 through the devices embedded therein. Reference can be made to the implementation method provided above for details, and the description is not repeated here.

In an example, at least one of the plurality of devices may be implemented through an artificial intelligence (AI) model. AI-related functions may be performed by the non-volatile memory, the volatile memory, and the processor. The processor may include one or more processors. In a non-limited example, the one or more processors may be general-purpose processors such as a central processing unit (CPU) and an application processor (AP), or dedicated graphics processors such as a graphics processing unit (GPU) and a vision processing unit (VPU), and/or dedicated AI processors such as a neural processing unit (NPU).

The one or more processors may control the processing of input data based on a predefined operation rule or AI model stored in the non-volatile memory and the volatile memory. The one or more processors may provide the predefined operation rule or AI model through training or learning. In the examples, providing the predefined operation rules or AI model through learning may indicate obtaining a predefined operation rule or AI model with desired characteristics by applying a learning algorithm to a plurality of pieces of training data. The training may be performed by a device having an AI function according to the examples, or by a separate server and/or system.

The AI model may include a plurality of neural network layers. Each of the neural network layers may have a plurality of weight values, and calculation of one layer may be performed through a calculation result of a previous layer and a plurality of weight values of a current layer. A neural network may include, as non-limited examples, a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network, but is not limited thereto.

The learning algorithm may be a method of training a predetermined target apparatus (e.g., a robot) based on a plurality of pieces of training data and of enabling, allowing or controlling the target apparatus to perform determination or prediction. The learning algorithm may include, as examples, supervised learning, unsupervised learning, semi-supervised learning, or reinforcement learning, but is not limited thereto.

The AI model may use image data as input data of the AI model to obtain a result of detecting a target object in a predetermined frame image of a video. The AI model may be obtained through training. In the examples, "being obtained through training" refers to obtaining a predefined operation rule or AI model that is configured to perform a desired feature (or objective) by training a basic AI model with a plurality of sets of training data through a training algorithm. The AI model may include a plurality of neural network layers. Each of the plurality of neural network layers may include a plurality of weight values, and a neural network computation may be performed by a calculation between a calculation result from a previous layer and the plurality of weight values.

The examples described above may be applied to visual understanding. Visual understanding is a technology associated with human-like visual recognition and processing and may include, as examples, object recognition, object tracking, image search, human recognition, scene recognition, 3D reconstruction/positioning, or image augmentation.

The neural network apparatuses, the object detection apparatus 800, the target object processing module 850, processor 910, user interface 930, network interface 940, storage 950, and other apparatuses, units, modules, devices, and other components described herein and with respect to FIGS. 1-9, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-9 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

A number of example embodiments have been described above. Nevertheless, it should be understood that various modifications may be made to these example embodiments. In an example, suitable results may be achieved if the described techniques are performed in a different order and/or if components in a described system, architecture, device, or circuit are combined in a different manner and/or replaced or supplemented by other components or their equivalents.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detecting method, comprising:
   detecting an object from a frame image of a video comprising a plurality of sequential frame images based on a target template set and an interference template set;
   determining an integrated target feature by integrating image features of image areas respectively corresponding to target templates included in the target template set;
   updating the target template set by adjusting the integrated target feature according to a change in similarity of the detected object across the sequential frame images; and
   outputting detected object information regarding the detected object,
   wherein the target template set comprises one or more target templates,
   wherein each of the one or more target templates comprises respective frame object information of the object in respective frame images determined to be frame images including the object among other frame images previous to the sequential frame images,
   wherein the interference template set comprises one or more interference templates,
   wherein the detecting of the object from the frame image comprises:
      obtaining one or more target candidate areas determined to be target candidate areas including the object in the frame image, based on the target template set and the interference template set; and determining one target area from among the one or more target candidate areas, and wherein the determining of the one target area from among the one or more target candidate areas comprises:

calculating matching degrees of the one or more target candidate areas to each target template of the target template set;

calculating matching degrees of the one or more target candidate areas to each interference template of the interference template set; and calculating target matching degrees of the target candidate areas based on the matching degrees of the target candidate areas to each target template of the target template set and the matching degrees of the target candidate areas to each interference template of the interference template set.

2. The method of claim 1, wherein the target template set further comprises an initial target template, and wherein the initial target template comprises initial object information of the object in a frame image determined by a user to be a frame image that includes the object among the sequential frame images, or a separate image that is independent of the video and includes the object.

3. The method of claim 1, wherein the obtaining one or more target candidate areas is further based on the integrated target feature.

4. The method of claim 3, wherein the obtaining of the one or more target candidate areas comprises:

determining a plurality of search areas within the frame image;

obtaining search area features by extracting respective image features of the plurality of search areas;

calculating correlations between the search area features of the plurality of search areas and the integrated target feature; and determining the one or more target candidate areas from among the plurality of search areas based on the correlations.

5. The method of claim 3, further comprising:

wherein the updating of the target template set comprises:

calculating the similarity of the target area to the integrated target feature of the target template set; and adding the target area as a target template to the target template set in response to the similarity being less than a threshold.

6. The method of claim 3, wherein the detecting of the object from the frame image comprises:

obtaining one or more target candidate areas determined to be target candidate areas including the object in the frame image; and determining one target area from among the one or more target candidate areas, wherein the method further comprises:

updating the target template set in response to the target area satisfying a predetermined condition.

7. The method of claim 6, wherein the updating of the target template set comprises:

calculating similarities of the target area to all target templates of the target template set; and adding the target area as a target template to the target template set in response to all the similarities of the target area being less than a threshold.

8. The method of claim 1, wherein each of the one or more interference templates comprises interference object information regarding an interference object that interferes with the detection of the object among the other frame images.

9. The method of claim 1, wherein the determining of the one target area from among the one or more target candidate areas comprises:

determining one target area from among the one or more target candidate areas based on the target matching degrees of the target candidate areas.

10. The method of claim 9, wherein the calculating of the target matching degrees of the target candidate areas comprises calculating the target matching degrees of the target candidate areas based on one of a mean value and a median value of the matching degrees of the target candidate areas to each target template of the target template set and/or one of a mean value and a median value of the matching degrees of the target candidate areas to each interference template of the interference template set.

11. The method of claim 1, wherein the obtaining of the one or more target candidate areas comprises:

determining the integrated target feature based on the target template set;

determining an integrated interference feature based on the interference template set; and obtaining the one or more target candidate areas from the frame image based on the integrated target feature and the integrated interference feature.

12. The method of claim 11, wherein the determining of the integrated target feature based on the target template set comprises determining the integrated target feature by integrating image features of image areas respectively corresponding to target templates included in the target template set, and wherein the determining of the integrated interference feature based on the interference template set comprises determining the integrated interference feature by integrating image features of image areas respectively corresponding to interference templates included in the interference template set.

13. The method of claim 11, wherein the determining of the integrated target feature based on the target template set comprises determining the integrated target feature based on all target templates included in the target template set, and wherein the determining of the integrated interference feature based on the interference template set comprises determining the integrated interference feature based on all interference templates included in the interference template set.

14. The method of claim 11, further comprising:

updating the interference template set, wherein the updating of the interference template set comprises adding one of a portion or all of the other target candidate areas except for the one target area among the one or more target candidate areas as interference templates to the interference template set.

15. The method of claim 11, further comprising:

updating the interference template set, wherein the updating of the interference template set comprises:

calculating similarities of one of a portion or all of the other target candidate areas to the integrated interference feature of the interference template set; and adding a target candidate area having a similarity less than a threshold value among the portion or all of the other target candidate areas as an interference template to the interference template set.

16. An electronic device, comprising:

a memory and one or more processors, wherein the memory is communicatively coupled to the processor, and stores processor instructions, which, on execution, causes the processor to:

detect an object from a frame image of a video comprising a plurality of sequential frame images based on a target template set and an interference template set;

determine an integrated target feature by integrating image features of image areas respectively corresponding to target templates included in the target template set;

update the target template set by adjusting the integrated target feature according to a change in similarity of the detected object across the sequential frame images; and output detected object information regarding the detected object, wherein the target template set comprises one or more target templates, wherein each of the one or more target templates comprises respective frame object information of the object in respective frame images determined to be frame images including the object among other frame images previous to the sequential frame images, wherein the interference template set comprises one or more interference templates, wherein the detecting of the object from the frame image comprises:

obtaining one or more target candidate areas determined to be target candidate areas including the object in the frame image, based on the target template set and the interference template set; and determining one target area from among the one or more target candidate areas, and wherein the determining of the one target area from among the one or more target candidate areas comprises:

calculating matching degrees of the one or more target candidate areas to each target template of the target template set;

calculating matching degrees of the one or more target candidate areas to each interference template of the interference template set; and calculating target matching degrees of the target candidate areas based on the matching degrees of the target candidate areas to each target template of the target template set and the matching degrees of the target candidate areas to each interference template of the interference template set.

17. A non-transitory computer-readable storage medium storing instructions that, when executed by one or more processors, cause the one or more processors to perform the method of claim 1.

* * * * *